(12) United States Patent
Feng et al.

(10) Patent No.: US 12,466,007 B2
(45) Date of Patent: Nov. 11, 2025

(54) WELDING FIXTURE AND LOCKING METHOD

(71) Applicant: RI MING COMPUTER ACCESSORY(Shanghai) CO., LTD., Shanghai (CN)

(72) Inventors: Cheng Feng, Shanghai (CN); Bing Pan, Shanghai (CN); Qiang Liu, Shanghai (CN)

(73) Assignee: RI MING COMPUTER ACCESSORY (Shanghai) CO., LTD., Shanghai (CN)

( * ) Notice: Subject to any disclaimer, the term of this patent is extended or adjusted under 35 U.S.C. 154(b) by 599 days.

(21) Appl. No.: 18/072,937

(22) Filed: Dec. 1, 2022

(65) Prior Publication Data

US 2023/0226650 A1    Jul. 20, 2023

Related U.S. Application Data

(63) Continuation of application No. PCT/CN2022/099291, filed on Jun. 17, 2022.

(30) Foreign Application Priority Data

Jan. 14, 2022  (CN) .......................... 202210040324.2

(51) Int. Cl.
  *B23K 37/04*   (2006.01)
(52) U.S. Cl.
  CPC ............................... *B23K 37/0426* (2013.01)

(58) Field of Classification Search
  CPC ............ B23K 37/0426; B23K 37/0461; B23K 37/0408; B23K 37/0443; B23K 26/21; B23K 2101/42
  See application file for complete search history.

(56) References Cited

U.S. PATENT DOCUMENTS

| 9,555,522 | B2* | 1/2017 | Evans ................... B23K 26/244 |
| 10,137,539 | B2* | 11/2018 | Zhang ................ B23K 37/0435 |
| 11,173,574 | B2* | 11/2021 | Worthing, Jr. ............ B22F 5/04 |

(Continued)

FOREIGN PATENT DOCUMENTS

CN          205309595 U     6/2016

*Primary Examiner* — Seahee Hong
(74) *Attorney, Agent, or Firm* — Hemisphere Law, PLLC; Zhigang Ma

(57) ABSTRACT

A welding fixture and a locking method are provided. The welding fixture includes a base and workpiece positioning dies; a top pressing plate slidably connected to the base in a pressing lifting direction is configured to press top surfaces of workpieces placed on the workpiece positioning dies; welding avoidance grooves are disposed on the top pressing plate, and each of the welding avoidance grooves is located above a corresponding one of the workpiece positioning dies; and a side-pressing mechanism disposed on the base is configured to perform and cancel lateral pressing of the workpieces. The welding fixture has advantages: the side-pressing mechanism can achieve tight pressing of sides of multiple workpieces at the same time, and the side-pressing mechanism can also cancel the tight pressing of the sides of the multiple workpieces after welding at the same time, which can greatly improve clamping efficiency and efficiency of unloading the workpieces.

13 Claims, 6 Drawing Sheets

(56) References Cited

U.S. PATENT DOCUMENTS

| | | | |
|---|---|---|---|
| 11,198,182 B2 * | 12/2021 | Worthing, Jr. | B22F 10/85 |
| 11,344,979 B2 * | 5/2022 | Fedyk | F16B 21/165 |
| 2017/0282308 A1 * | 10/2017 | Tymosch | B23Q 3/061 |
| 2021/0178529 A1 * | 6/2021 | Stranz | B23K 37/0443 |

* cited by examiner

WELDING FIXTURE AND LOCKING METHOD

TECHNICAL FIELD

The disclosure belongs to the technical field of multi-workpiece laser welding connection, in particular to a welding fixture and a locking method.

BACKGROUND

In recent years, the computer, communication and consumer electronic (shorted as 3C) industry has developed rapidly, size requirements are becoming more and more refined, and materials that need to be assembled are getting smaller and smaller. The assembly of these fine products requires laser welding machines, and the laser welding machine includes a welding machine body, a welding fixture, and welding products.

In a process of welding operation, the most important thing is to ensure functional stability and position degrees of products after assembly. The difficulty in the assembly process is to control a distance between the products stably and effectively. The control of the gap between the products after the welding operation is also a difficulty.

In traditional assembly, two objects can be assembled together by positioning. This assembly method needs to calculate more cumulative tolerances, and size deviations of the welded products are large, which makes it impossible to effectively control product gaps. The assembled products are prone to functional failure and size out of tolerance. For example, a Chinese patent which has an application number CN201521106978.2 discloses a post terminal electrical core laser welding fixture, including: a fixture body and a fixing flat; the fixing flat is disposed on an upper end of the fixture body; an upper end surface of the fixture body is provided with a groove; an inside of the groove is provide with an electrical core; the inside of the groove is provided with slots to clamp the electrical core; cylinders are disposed at centers of opposite sides of the groove respectively; the fixing flat is in a cross shape; two ends of the fixing flat on a same straight line are provided with cylindrical fixing holes; two ends of the fixing flat on another straight line are provided with post terminal fixing holes; a post terminal is disposed in the post terminal fixing hole; the cylinder is disposed in the cylinder fixing hole, therefore, the post terminal is positioned on the electrical core. In the above way, the scheme can ensure an accurate position to be welded and improve the welding quality and production efficiency.

Although the above scheme has the above advantages, the positioning and pressing of products and the process of taking and placing materials are tedious and inefficient, which does not solve the above technical problems.

SUMMARY

A purpose of the disclosure is to provide a weld welding fixture and a locking method for solving the above technical problems.

To achieve the above purpose, following technical solutions are used in the disclosure.

The welding fixture includes a base and workpiece positioning dies disposed on the base, and where the welding fixture further includes:
  a top pressing plate, slidably connected with the base in a pressing lifting direction, and the top pressing plate being configured to press top surfaces of workpieces placed on the workpiece positioning dies;
  welding avoidance grooves, disposed on the top pressing plate, and each of the welding avoidance grooves being located above a corresponding one of the workpiece positioning dies;
  a side-pressing mechanism, disposed on the base, the side-pressing mechanism being configured to perform and cancel lateral pressing of the workpieces, and the workpiece position dies are profiling dies.

In the welding fixture, the side-pressing mechanism is a multi-directional side-pressing mechanism in X-axis and Y-axis directions.

In the welding fixture, the side-pressing mechanism includes:
  eight numbers of side-pushing self-pressing sliding blocks; wherein every two of the side-pushing self-pressing sliding blocks are in pairs, each of the side-pushing self-pressing sliding blocks is slidably connected to the base by a transverse elastic part in a side-pushing pressing direction, and the transverse elastic parts corresponding to the side-pushing self-pressing sliding blocks are configured to force the two side-pushing self-pressing sliding blocks in each of the pairs of the side-pushing self-pressing sliding blocks to move oppositely, thereby to press sides of the workpieces under elastic actions of the transverse elastic parts; and
  a side-pressing canceling control assembly, configured to simultaneously drive the two side-pushing self-pressing sliding blocks in each of the pairs of the side-pushing self-pressing sliding blocks to move closely, thereby to cancel the side-pushing self-pressing sliding blocks from contacting with the workpieces.

In the welding fixture, the side-pressing canceling control assembly includes:
  a cross-shaped lifting plate, elastically connected to the base by vertical elastic components arranged in a pressing direction; and
  the cross-shaped lifting plate is provided with four end segments, each of the end segments corresponds to each of the pairs of the side-pushing self-pressing sliding blocks, and each of wedge-shaped fitting structures is defined between each of the end segments and the corresponding pair of the side-pushing self-pressing sliding blocks, when the cross-shaped lifting plate descends, the two side-pushing self-pressing sliding blocks in each of the pairs of the side-pushing self-pressing sliding blocks move closely under action of the corresponding wedge-shaped fitting structure.

In the welding fixture, the wedge-shaped fitting structures include:
  a wedge-shaped groove disposed on each of the side-pushing self-pressing sliding blocks; and
  inclined parts with splayed distribution disposed on two sides of each of the end segments in a length direction; and the inclined parts on each of the end segments extend into the corresponding wedge-shaped grooves to make the two side-pushing self-pressing sliding blocks in each of the pairs of the side-pushing self-pressing sliding blocks move closely.

In the welding fixture, where the side-pressing canceling control assembly further includes:
  an avoidance hole disposed at a center of the cross-shaped lifting plate;
  a control handle connected to the base through a hinged structure passing through the avoidance hole, and wherein the control handle is disposed on an upper surface of the cross-shaped lifting plate;

a side-pressing plane disposed on the control handle, wherein when the side-pressing plane coincides with the upper surface of the cross-shaped lifting plate, the vertical elastic components force the cross-shaped lifting plate to reset upwards and the transverse elastic parts force the corresponding side-pushing self-pressing sliding blocks to press the sides of the workpieces tightly; and canceling side-pressing curved surfaces disposed on the control handle, wherein when the control handle is rotated, one of the canceling side-pressing curved surfaces is in contact with the upper surface of the cross-shaped lifting plate, and the transverse elastic parts are forced to shrink elastically under the action of the wedge-shaped fitting structures to cancel tight pressing of the sides of the workpieces.

In the welding fixture, the base is provided with wedge-shaped limiting blocks located below the respective end segments, and each of the wedge-shaped limiting blocks is configured to limit the inclined parts on each of the end segments from excessive downward descent.

In the welding fixture, a lower surface of the top pressing plate is provided with a cross-shaped guide groove, the cross-shaped lifting plate is disposed in the cross-shaped guide groove, a handle avoidance through hole is provided in a central area of the top pressing plate, and the control handle passes through the handle avoidance through hole.

In the welding, the vertical elastic components have two groups, and the two groups of the vertical elastic components are distributed in the X-axis direction or the Y-axis direction.

In the welding fixture, a vertical guide mechanism is connected between each of two diagonal areas of the top pressing plate and the base.

In the welding fixture, two numbers of locking control frames disposed at two ends of the top pressing plate in a length direction are hinged to the base, and the locking control frames are locked at the two ends of the top pressing plate in the length direction respectively.

The disclosure further provides a locking method for welding, by using the welding fixture, the locking method includes:

S1, placing: placing the workpieces on the workpiece positioning dies; and

S2, tight pressing: pressing, by the top pressing plate, the top surfaces of the workpieces; and pressing, by the side-pressing mechanism, the sides of the workpieces tightly.

In the locking method for welding, in the step S2, the pressing, by the side-pressing mechanism, the sides of the workpieces tightly includes:

S20, the tight pressing: rotating the control handle, when the side-pressing plane coincides with the upper surface of the cross-shaped lifting plate, forcing, by the vertical elastic components, the cross-shaped lifting plate to reset upwards and forcing, by the transverse elastic parts, the corresponding side-pushing self-pressing sliding blocks to press the sides of the workpieces tightly; and S21, canceling of the tight pressing: rotating the control handle; when one of the canceling side-pressing curved surfaces is contact with the upper surface of the cross-shaped lifting plate, forcing the transverse elastic parts to shrink elastically under the action of the wedge-shaped fitting structures, thereby to cancel the tight pressing of the sides of the workpieces.

Compared with the prior art, the disclosure has following advantages.

A top pressing plate and a side-pressing mechanism can press workpieces in multiple dimensions tightly, which can improve position tolerances between welding workpieces and ensure the final welding quality.

The side-pressing mechanism can achieve tight pressing of sides of multiple workpieces at the same time, and the side-pressing mechanism can also cancel the tight pressing of the sides of the multiple workpieces after welding at the same time. This method can greatly improve clamping efficiency and efficiency of unloading the workpieces.

The side-pressing mechanism can not only perform a function of fixing the workpieces, but also position side pushing edges, which reduces accumulated tolerances and improves dimensional accuracy of the workpieces.

DESCRIPTION OF REFERENCE NUMERALS

1—base; 10—workpiece; 2—top pressing plate; 20—welding avoidance groove; 22—handle avoidance through hole; 3—side-pressing mechanism; 30—side-pushing self-pressing sliding block; 300—wedge-shaped groove; 31—transverse elastic part; 32—side-pressing canceling control assembly; 320—cross-shaped lifting plate; 321—vertical elastic component; 322—inclined part; 323—avoidance hole; 324—control handle; 325—side-pressing plane; 326—canceling side-pressing curved surface; 327—hinged shaft; 328—hinged base; 329—bearing; 4—vertical guide mechanism; 5—locking control frame.

DETAILED DESCRIPTION OF EMBODIMENTS

The following are specific embodiments of the disclosure and further describe the technical solutions of the disclosure in combination with the attached drawings, but the disclosure is not limited to these embodiments Embodiment 1

Figure 1:
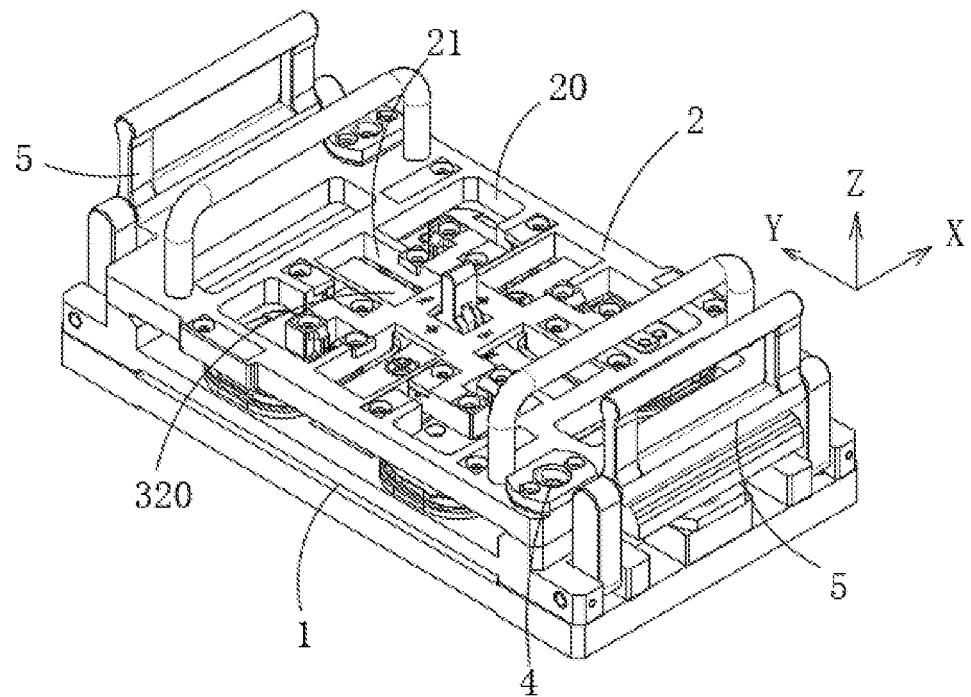
FIG. 1 is a three-dimensional structure diagram of the welding fixture provided by the disclosure.
Figure 2:
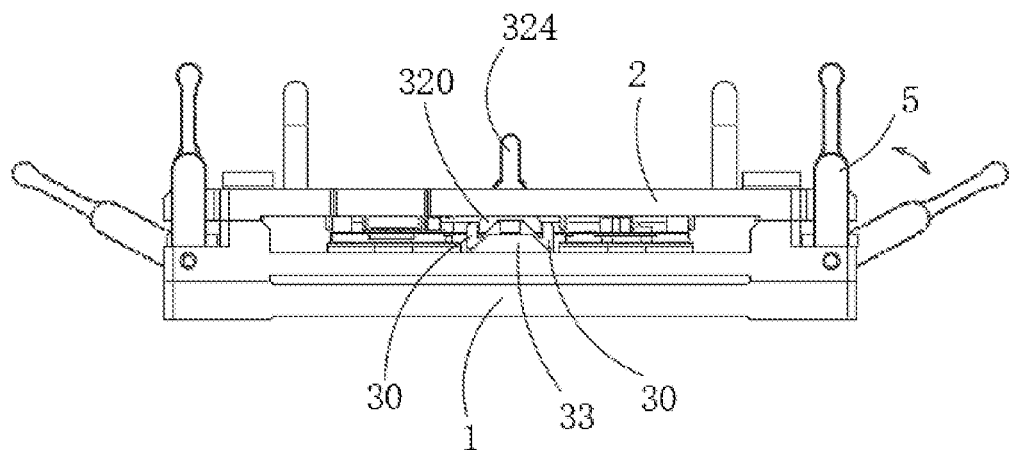
FIG. 2 is a side view structure diagram of the welding fixture provided by the disclosure.
Figure 3:
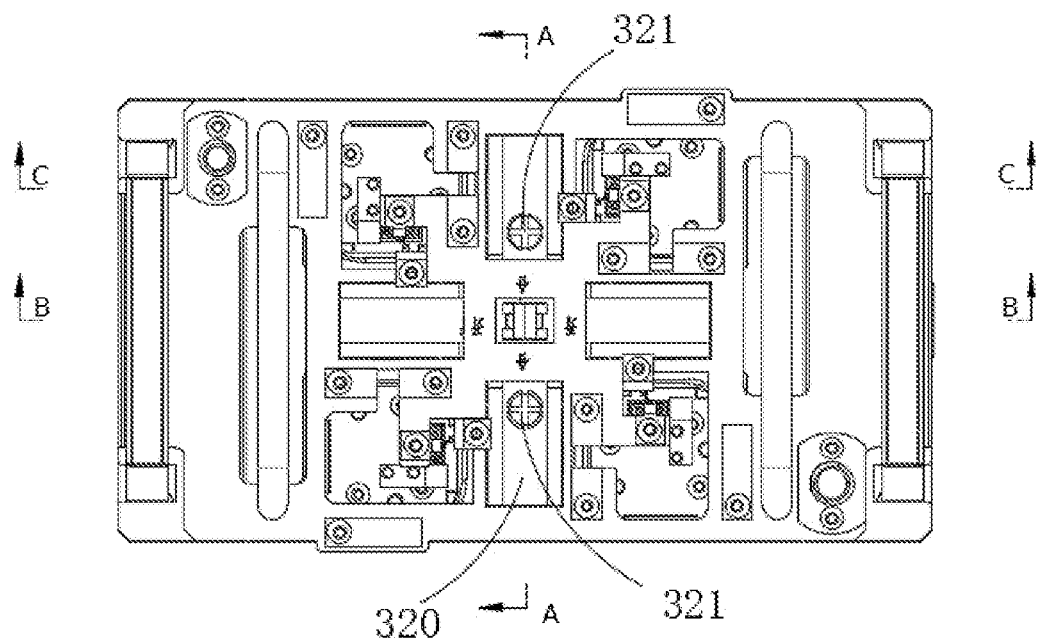
FIG. 3 is a top view structure diagram of the welding fixture provided by the disclosure.
Figure 4:
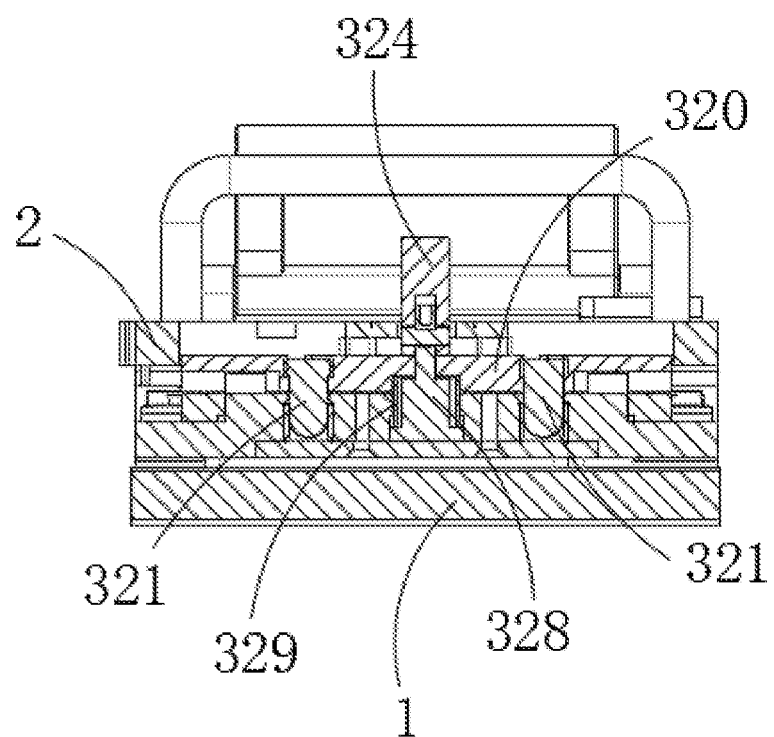
FIG. 4 is a cross-sectional view taken along line A-A in FIG. 3.
Figure 5:
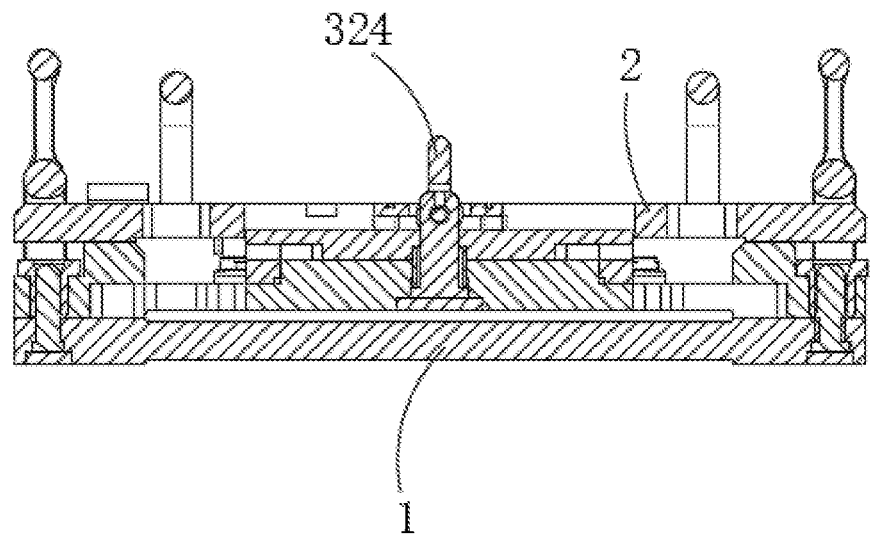
FIG. 5 is a cross-sectional view taken along line B-B in FIG. 3.

As shown in FIG. 1, the embodiment 1 provide a welding fixture, the welding fixture is used for a laser welding equipment to fix multiple points of workpieces at the same time. The fixation adopts tight pressing of tops of the workpieces and tight pressing of sides of the workpieces, that is, tight pressing of the workpieces in multiple dimensions to ensure the welding quality.

Specifically, as shown in FIGS. 1~3 and FIG. 7, the welding fixture of the embodiment 1 includes a base 1, workpiece positioning dies 10, a top pressing plate 2, welding avoidance grooves 20, and a side-pressing mechanism 3.

The side-pressing mechanism 3 and the top pressing plate 2 are configured to realize the tight pressing of the workpieces in multiple dimensions, and the welding avoidance grooves 20 are configure to avoid a welding nozzle during laser welding.

The side-pressing mechanism 3 can achieve tight pressing of sides of multiple workpieces at the same time, and the side-pressing mechanism 3 can also cancel the tight pressing of the sides of the multiple workpieces after welding at the same time. This method can greatly improve clamping efficiency and efficiency of unloading the workpieces.

In an embodiment, the workpiece positioning dies 10 are disposed on the base 1, and a number of the workpiece positioning dies 10 are in a range of one to four. Of course, the number of the workpiece positioning dies 10 may be more, and this will not be further described in the embodiment 1.

The top pressing plate 2 is slidably connected with the base 1 in a pressing lifting direction, and the top pressing plate 2 is configured to tightly press top surfaces of workpieces placed on the workpiece positioning dies 10. The top pressing plate 2 can be pressed down manually or mechanically. For example, the top pressing plate 2 is pressed down manually, that is, two numbers of locking control frames 5 disposed at two ends of the top pressing plate 2 in a length direction are hinged to the base 1, and the locking control frames 5 are locked at the two ends of the top pressing plate 2 in the length direction respectively. The locking control frames 5 are hinged to the base 1 and lock the two ends of the top pressing plate 2, so that the top pressing plate 2 can press the workpiece downward tightly.

In order to improve smoothness and stability of lifting movements of the top pressing plate 2, a vertical guide mechanism 4 is connected between each of two diagonal areas of the top pressing plate 2 and the base 1. Specifically, a fitting mode of the vertical guide mechanism 4 in the embodiment 1 is a fitting mode of a guide column and a guide sleeve, or a fitting mode of a guide column and the guide hole. For example, the guide column is fixed on the base 1, and each of the two diagonal areas of the top pressing plate 2 is provided with the guide sleeve. The guide column penetrates the guide sleeve to achieve a guided fit.

The following further describes the embodiment with four workpiece positioning dies 10.

Specifically, as shown in FIGS. 1-7, the side-pressing mechanism 3 of the embodiment 1 includes side-pushing self-pressing sliding blocks 30 and a side-pressing canceling control assembly 32.

In an embodiment, a number of the side-pushing self-pressing sliding blocks is eight. Every two of the side-pushing self-pressing sliding blocks 30 are in pairs, each of the side-pushing self-pressing sliding blocks 30 is slidably connected to the base 1 by a transverse elastic part 31 in a side-pushing pressing direction, and the transverse elastic parts 31 corresponding to the side-pushing self-pressing sliding blocks 30 are configured to force the side-pushing self-pressing sliding blocks 30 in each of the pairs of the side-pushing self-pressing sliding blocks 30 to move oppositely, thereby to press sides of the workpieces under elastic actions of the transverse elastic parts 31; and a fitting mode of the slidable connection between each of the side-pushing self-pressing sliding blocks 30 and the base 1 is a fitting mode of sliding grooves and sliding parts. For example, the sliding parts disposed on two sides of each of the side-pushing self-pressing sliding blocks 30 corresponds to the sliding grooves disposed on the base 1, this fitting mode can realize sliding guidance and prevent the sliding parts from separating from the sliding grooves upwards.

In an embodiment, a surface of each of the side-pushing self-pressing sliding blocks 30 is provided with a first spring positioning blind hole which corresponds to a second spring positioning blind hole provided by the base 1, the transverse elastic parts 31 are springs, an end of each of the transverse elastic parts 31 acts on a hole bottom of the first spring positioning blind hole, and another end of each of the transverse elastic parts 31 acts on a hole bottom of the second spring positioning blind hole. The transverse elastic parts 31 corresponding to the side-pushing self-pressing sliding blocks 30 are configured to force the side-pushing self-pressing sliding blocks 30 in each of the pairs of the side-pushing self-pressing sliding blocks 30 to move oppositely, thereby to press sides of the workpieces under elastic actions of the transverse elastic parts 31, thereby to achieve the tight pressing of the sides of the workpieces.

Preferably, an axis line of the first spring positioning blind hole and an axis line of the second spring positioning blind hole in the embodiment 1 are on the same straight line, and the side-pushing self-pressing sliding blocks in each of the pairs of the side-pushing self-pressing sliding blocks 30 are symmetrically distributed, which can ensure a balance of the tight pressing of the sides of the workpieces.

A side-pressing canceling control assembly 32 is configured to simultaneously drive the side-pushing self-pressing sliding blocks 30 in each of the pairs of the side-pushing self-pressing sliding blocks 30 to move closely, thereby to cancel the side-pushing self-pressing sliding blocks 30 from contacting with the workpieces. That is, the workpieces can be unloaded by this way to improve production efficiency.

As shown in FIGS. 1-7, in order to facilitate locking and unlocking operation (that is, performing and canceling the tight pressing of the workpieces), the side-pressing canceling control assembly 32 of the embodiment 1 includes a cross-shaped lifting plate 320, a central area of the cross-shaped lifting plate 320 is elastically connected to the base 1 by vertical elastic components 321 arranged in a pressing direction. The vertical elastic components 321 include vertical springs, and an upper end of each of the vertical springs acts on the cross-shaped lifting plate 320 and a lower end of each of the vertical springs acts on the base 1, thereby to reset the cross-shaped lifting plate 320 in time, which facilitates the side-pushing self-pressing sliding blocks 30 to reach a side-pressing position in time.

Preferably, the vertical elastic components 321 have two groups, and the two groups of the vertical elastic components 321 are distributed in the X-axis direction, such as the X-axis direction of the cross-shaped lifting plate 320.

Figure 6:
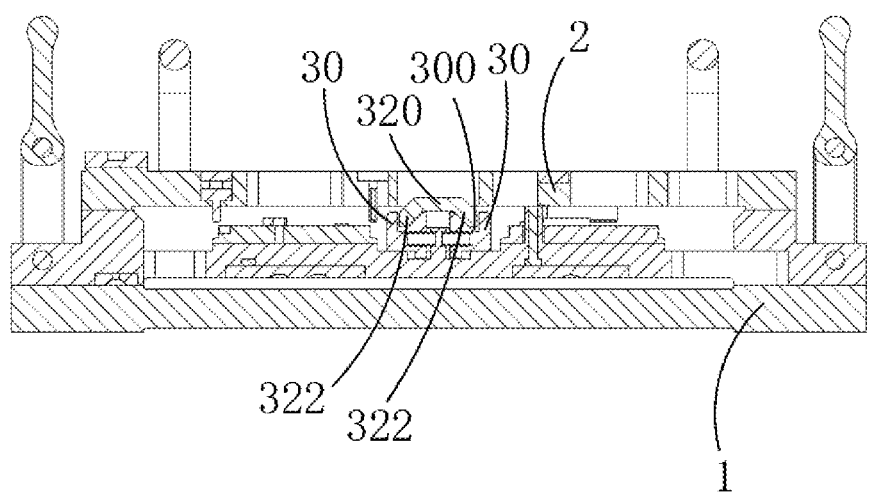
FIG. 6 is a cross-sectional view taken along line C-C in FIG. 3.
Figure 7:
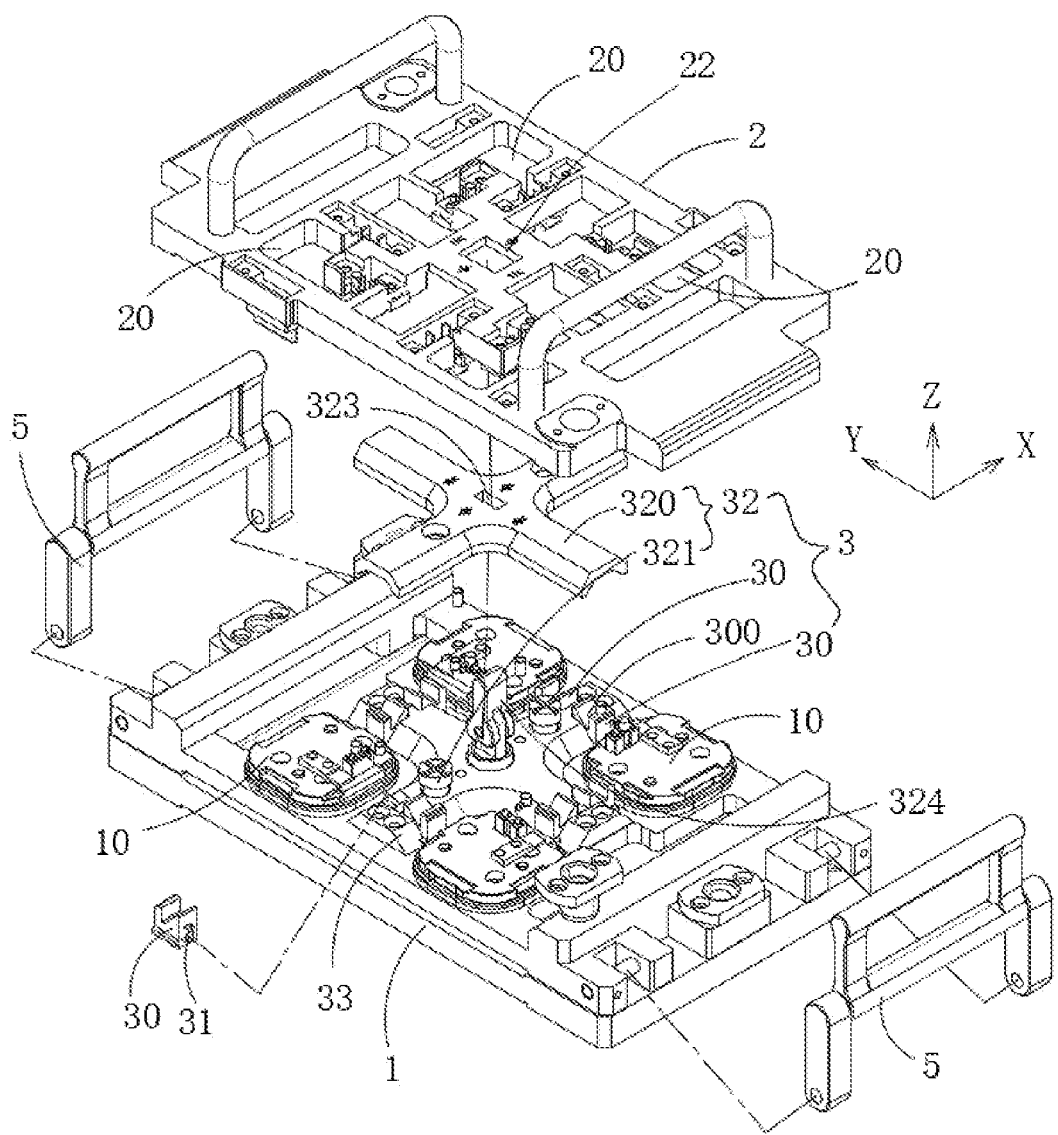
FIG. 7 is an exploded structure diagram of the welding fixture provided by the disclosure.
Figure 8:
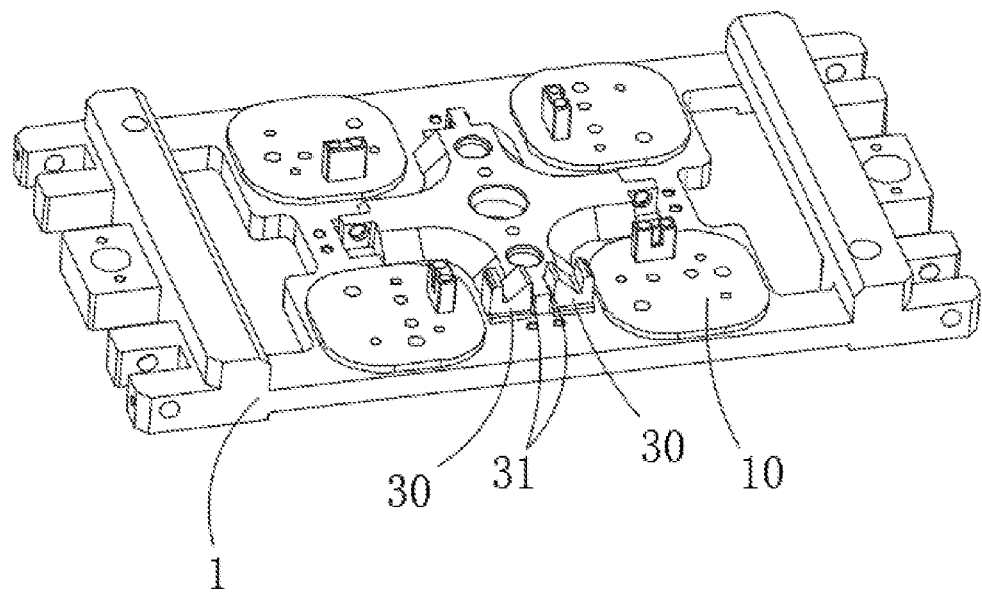
FIG. 8 is a structural diagram of a base provided by the disclosure.
Figure 9:
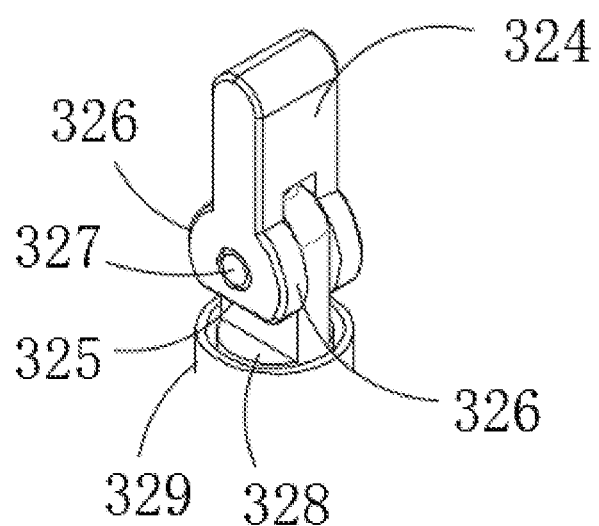
FIG. 9 is a structural diagram of a side-compacting canceling control assembly provided by the disclosure.
Figure 10:
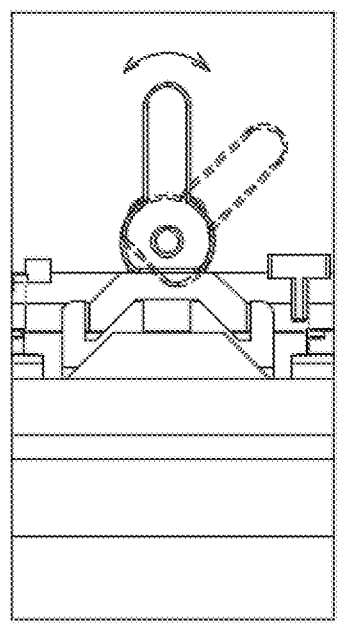
FIG. 10 is a schematic diagram of a process of a control handle from pressing to canceling the pressing provided by the disclosure.
Figure 10:
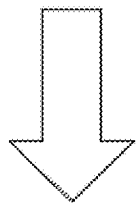
Figure 10:
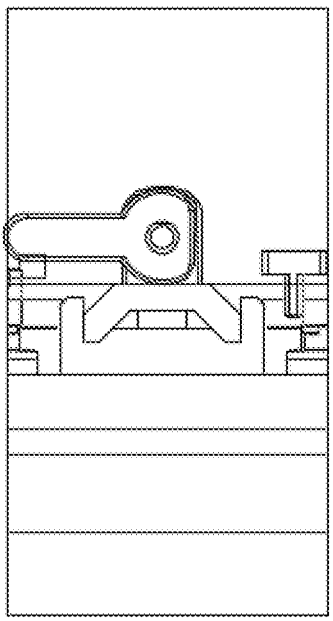

Preferably, as shown in FIGS. 6-8, the cross-shaped lifting plate 320 is provided with four end segments, the end segments correspond to the pairs of the side-pushing self-pressing sliding blocks 30 respectively, and each of wedge-shaped fitting structures is defined between each of the end segments and the corresponding pair of the side-pushing self-pressing sliding blocks 30, when the cross-shaped lifting plate 320 descends, the side-pushing self-pressing sliding blocks 30 in each of the pairs of the side-pushing self-pressing sliding blocks 30 move closely under action of the corresponding wedge-shaped fitting structure. By this method, lateral pressing of the workpieces (that is, the tight pressing of sides of the workpieces) can be canceled by eight numbers of the side-pushing self-pressing sliding blocks 30, that is, the side-pushing self-pressing sliding blocks 30 in each of the pairs of the side-pushing self-pressing sliding blocks 30 move closely to each other, which can improve the operation efficiency and the production efficiency. For more details, the wedge-shaped fitting structures include a wedge-shaped groove 300 disposed on each of the side-pushing self-pressing sliding blocks 30, and a notch of the wedge-shaped groove 300 is upward. Two sides of each of the end segments of the cross-shaped lifting plate 320 in a length direction are respectively provided with inclined parts 322 with splayed distribution, and the inclined parts 322 on each of the end segments of the cross-shaped lifting plate 320 extend into the corresponding wedge-shaped grooves 300 to make the two side-pushing self-pressing sliding blocks 30 in each of the pairs of the side-pushing self-pressing sliding blocks 30 move closely. That is, when each of the side-pushing self-pressing sliding blocks 30 is at a corresponding side-pressing position, a distance between wedge-shaped inclined planes of the wedge-shaped grooves 300 of each of the pairs of the side-pushing self-pressing sliding blocks 30 is greater than a distance between the inclined parts 322 corresponding to the wedge-shaped inclined planes. As the cross-shaped lifting plate 320 descends, the contact between inner inclined surfaces of the inclined parts 322 and wedge-shaped inclined surfaces of the wedge-shaped grooves 300 increases, thereby to make the side-pushing self-pressing sliding blocks 30 corresponding to the inclined parts 322 close to each other. At this time, the transverse elastic parts 31 are compressed to generate elastic forces, thereby to provide resilience for the later reset of the side-pushing self-pressing sliding blocks 30.

As another the wedge-shaped fitting structure, the structure includes lower inclined planes disposed on the side-pushing self-pressing sliding blocks 30, both sides of each of the end segments of the cross-shaped lifting plate 320 in a length direction are respectively provided with inclined parts 322 with splayed distribution. The fitting of the inclined parts 322 and the lower inclined planes can also make the side-pushing self-pressing sliding blocks 30 in each of the pairs of the side-pushing self-pressing sliding blocks 30 move closely to each other.

In order to limit the inclined parts 322 from excessive downward descent, the base 1 is provided with wedge-shaped limiting blocks 33 located below the respective end segments of the cross-shaped lifting plate 320, and each of the wedge-shaped limiting blocks 33 is configured to limit the inclined parts 322 on each of the end segments of the cross-shaped lifting plate 320 from the excessive downward descent. Each of the wedge-shaped limiting blocks 33 is provided with two inclined limit planes with splayed distribution, and the inclined parts 322 can define a descending limit after the inclined limit planes coincides with the inclined parts 322.

Preferably, as shown in FIG. 6, FIG. 7, FIG. 9, and FIG. 10. The side-pressing canceling control assembly 32 further includes an avoidance hole 323, a control handle 324, a side-pressing plane 325, and canceling side-pressing curved surfaces 326. The avoidance hole 323 is disposed at a center of the cross-shaped lifting plate 320, and the avoidance hole 323 is one of a round hole and a square hole.

The control handle 324 is connected to the base 1 through a hinged structure passing through the avoidance hole 323, and the control handle 324 is disposed on an upper surface of the cross-shaped lifting plate 320. The hinged structure includes a hinged shaft 327 and a hinged shaft penetration hole matched with the hinged shaft 327. For example, a hinged base 328 is disposed on the base 1, the control handle 324 is provided with a fitting groove for extending an upper end of the hinged base 328, the upper end of the hinged base 328 is provided with the hinged shaft penetration hole, and the fitting groove is provided with the hinged shaft 327, the hinged shaft 327 penetrates the hinged shaft penetration hole to achieve a hinged connection. In order to achieve rotation of the control handle 324, a rotation base is connected to a top of the hinged base 328 through a bearing 329, and the hinged shaft penetration is disposed on the rotation base, thereby to achieve the circumferential rotation of the control handle 324. The hinged base 328 can also be connected to the base 1 through the bearing 329.

In order to perform and cancel lateral pressing of the workpieces, as shown in FIGS. 1-7, the side-pressing plane 325 is disposed on the control handle 324, when the side-pressing plane 325 coincides with the upper surface of the cross-shaped lifting plate 320, the vertical elastic components 321 force the cross-shaped lifting plate 320 to reset upwards and the transverse elastic parts 31 force the corresponding side-pushing self-pressing sliding blocks 30 to press the sides of the workpieces tightly.

The canceling side-pressing curved surfaces 326 are disposed on the control handle 324, when the control handle 324 is rotated, one of the canceling side-pressing curved surfaces 326 is in contact with the upper surface of the cross-shaped lifting plate 320, and the transverse elastic parts 31 are forced to shrink elastically under the action of the wedge-shaped fitting structures to cancel tight pressing of the sides of the workpieces.

The combination of the side-pressing plane 325 and the canceling side-pressing curved surfaces 326 can switch different states. For example, the canceling side-pressing curved surfaces 326 of the embodiment 1 have a number of two and are symmetrically distributed, which makes the control handle 324 cancel the lateral pressing of the workpieces by the contact of any one of the canceling side-pressing curved surfaces 326 and the upper surface of the cross-shaped lifting plate 320 after rotating the control handle 324 in different directions. Of course, when a top of any one of the canceling side-pressing curved surfaces 326 is in contact with the cross-shaped lifting plate 320, the lateral pressing of the workpieces is cancelled completely.

Preferably, a lower surface of the top pressing plate 2 is provided with a cross-shaped guide groove 21, the cross-shaped lifting plate 320 is disposed in the cross-shaped guide groove 21, a handle avoidance through hole 22 is provided in a central area of the top pressing plate 2, and the control handle 324 passes through the handle avoidance through hole 22. The fitting of the cross-shaped guide groove 21 and the cross-shaped lifting plate 320 can make the cross-shaped lifting plate 320 lift stably, and the cross-shaped guide groove 21 is also configured to position the cross-shaped lifting plate 320, which improves accuracy of the welding fixture.

Furthermore, four ends of the cross-shaped guide groove 21 are respectively provided with vertical through holes to observe the position of the cross-shaped lifting plate 320 in real time.

The working principle of the embodiment 1 is as follows.

The workpieces are placed on the workpiece positioning dies 10 respectively, at this time, one of the canceling side-pressing curved surfaces of the control handle 324 is in contact with an upper surface of the cross-shaped lifting plate 320, which makes the side-pushing self-pressing sliding blocks 30 be not at side-pressing positions (also referred to lateral pressing positions), thereby to facilitate clamping the workpieces.

Then the top pressing plate 2 tightly presses tops of the workpieces under actions of lock catches of the locking control frames 5. In order to prevent the top pressing plate 2 from contacting with the workpiece positioning dies 10, a spacer block is disposed between a lower surface of the top pressing plate 2 and each of the workpiece positioning dies 10. Of course, the spacer block can contact the periphery of each of the workpiece positioning dies 10 or the base 1. However, when a workpiece is placed on the workpiece positioning die 10, the spacer block will not contact the workpiece positioning die 10 or the base 1 to prevent interference.

Furthermore, when the control handle 324 is rotated by 90 degrees, the side-pressing plane 325 coincides with the upper surface of the cross-shaped lifting plate 320, at this time, the vertical elastic components 321 force the cross-shaped lifting plate 320 to reset upwards, and the transverse elastic parts 31 force the corresponding side-pushing self-pressing sliding blocks 30 to move oppositely, thereby to make the side-pushing self-pressing sliding blocks 30 press the sides of the workpieces tightly, (that is, the transverse elastic parts 31 force the corresponding side-pushing self-pressing sliding blocks 30 press the sides of the workpieces tightly), and thus the lateral pressing of the workpieces is achieved.

The lateral pressing of the workpieces can be performed at one time, and the lateral pressing can be canceled at one time, which can greatly improve the production efficiency and improve the welding accuracy of the workpieces.

Embodiment 2

The structures and principle of the embodiment 2 are basically the same as that of the embodiment 1, but the different structures are that, as shown in FIG. 6, there are two groups of vertical elastic components 321 in the embodiment 2, and the two groups of vertical elastic components 321 are distributed on a Y-axis (not seen in the FIG. 6), for example, the Y axis can be a Y-axis of cross-shaped lifting plate 320.

Embodiment 3

Base on the embodiment 1 or the embodiment 2, as shown in FIGS. 1-10, the embodiment 3 provides a locking method for welding, by using the welding fixture of the embodiment 1 or the embodiment 2, the locking method for welding includes:
  S1, placing: placing the workpieces on the workpiece positioning dies 10; and
  S2, tight pressing: pressing, by the top pressing plate 2, the top surfaces of the workpieces; and pressing, by the side-pressing mechanism 3, the sides of the workpieces tightly.
In the step S2, the pressing, by the side-pressing mechanism 3, the sides of the workpieces tightly includes:
  S20, the tight pressing: rotating the control handle 324, when the side-pressing plane 325 coincides with the upper surface of the cross-shaped lifting plate 320, forcing, by the vertical elastic components 321, the cross-shaped lifting plate 320 to reset upwards and forcing, by the transverse elastic parts 31, the corresponding side-pushing self-pressing sliding blocks 30 to press the sides of the workpieces tightly; and
  S21, canceling of the tight pressing: rotating the control handle 324; when one of the canceling side-pressing curved surfaces 326 is contact with the upper surface of the cross-shaped lifting plate 320, forcing the transverse elastic parts 31 to shrink elastically under the action of the wedge-shaped fitting structures, thereby to cancel the tight pressing of the sides of the workpieces.

Embodiment 4

The structures and principle of the embodiment 4 are basically the same as that of embodiment 1, but the different structures are that, as shown in FIG. 7, the side-pressing mechanism 3 includes:
  four numbers of side-pushing self-pressing sliding blocks 30; for example, a pair of the side-pushing self-pressing sliding blocks 30 disposed in a X-axis direction, and a pair of the side-pushing self-pressing sliding blocks 30 disposed in a Y-axis direction;
  every two of the side-pushing self-pressing sliding blocks 30 are in pairs, each of the side-pushing self-pressing sliding blocks 30 is slidably connected to the base 1 by a transverse elastic part 31 in a side-pushing pressing direction, and the transverse elastic parts 31 corresponding to the side-pushing self-pressing sliding blocks 30 are configured to force the side-pushing self-pressing sliding blocks 30 in each of the pairs of the side-pushing self-pressing sliding blocks 30 to move oppositely, thereby to press sides of the workpieces under elastic actions of the transverse elastic parts 31; and
  a side-pressing canceling control assembly 32, configured to simultaneously drive the side-pushing self-pressing sliding blocks 30 in each of the pairs of the side-pushing self-pressing sliding blocks 30 to move closely, thereby to cancel the side-pushing self-pressing sliding blocks 30 from contacting with the workpieces.

Embodiment 5

The structures and principle of the embodiment 5 are basically the same as that of embodiment 1, but the different structures are that, as shown in FIG. 7, the side-pressing mechanism 3 includes:
  six numbers of side-pushing self-pressing sliding blocks 30; for example, two pairs of the side-pushing self-pressing sliding blocks 30 disposed in a X-axis direction, and a pair of the side-pushing self-pressing sliding blocks 30 disposed in a Y-axis direction; or two pairs of the side-pushing self-pressing sliding blocks 30 disposed in the Y-axis direction, and a pair of the side-pushing self-pressing sliding blocks 30 disposed in the X-axis direction;
  every two of the side-pushing self-pressing sliding blocks 30 are in pairs, each of the side-pushing self-pressing sliding blocks 30 is slidably connected to the base 1 by a transverse elastic part 31 in a side-pushing pressing direction, and the transverse elastic parts 31 corresponding to the side-pushing self-pressing sliding blocks 30 are configured to force the side-pushing self-pressing sliding blocks 30 in each of the pairs of the side-pushing self-pressing sliding blocks 30 to move oppositely, thereby to press sides of the workpieces under elastic actions of the transverse elastic parts 31; and a side-pressing canceling control assembly 32, configured to simultaneously drive the side-pushing self-pressing sliding blocks 30 in each of the pairs of the side-pushing self-pressing sliding blocks 30 to move closely, thereby to cancel the side-pushing self-pressing sliding blocks 30 from contacting with the workpieces.

The specific embodiments described herein are merely illustrative embodiments of the spirit of the disclosure. Those skilled in the art which the disclosure belongs may make various modifications or supplements to the described specific embodiments or replace them in similar manners, but this will not deviate from the spirit of the disclosure or go beyond the protection scope defined in the claims.

What is claimed is:

1. A welding fixture, comprising a base (1) and workpiece positioning dies (10) disposed on the base (1), wherein the welding fixture further comprises:
    a top pressing plate (2), slidably connected with the base (1) in a pressing lifting direction, and the top pressing plate (2) being configured to press top surfaces of workpieces placed on the workpiece positioning dies (10);
    welding avoidance grooves (20), disposed on the top pressing plate (2), and each of the welding avoidance grooves (20) being located above a corresponding one of the workpiece positioning dies (10); and
    a side-pressing mechanism (3), disposed on the base (1), and the side-pressing mechanism (3) being configured to perform and cancel lateral pressing of the workpieces.

2. The welding fixture according to claim 1, wherein the side-pressing mechanism (3) is a multi-directional side-pressing mechanism in X-axis and Y-axis directions.

3. The welding fixture according to claim 1, wherein the side-pressing mechanism (3) comprises:
    eight numbers of side-pushing self-pressing sliding blocks (30); wherein every two of the side-pushing self-pressing sliding blocks (30) are in pairs, each of the side-pushing self-pressing sliding blocks (30) is slidably connected to the base (1) by a transverse elastic part (31) in a side-pushing pressing direction, and the transverse elastic parts (31) corresponding to the side-pushing self-pressing sliding blocks (30) are configured to force the two side-pushing self-pressing sliding blocks (30) in each of the pairs of the side-pushing self-pressing sliding blocks (30) to move oppositely, thereby to press sides of the workpieces under elastic actions of the transverse elastic parts (31); and
    a side-pressing canceling control assembly (32), configured to simultaneously drive the two side-pushing self-pressing sliding blocks (30) in each of the pairs of the side-pushing self-pressing sliding blocks (30) to move closely, thereby to cancel the side-pushing self-pressing sliding blocks (30) from contacting with the workpieces.

4. The welding fixture according to claim 3, wherein the side-pressing canceling control assembly (32) comprises:
    a cross-shaped lifting plate (320), elastically connected to the base (1) by vertical elastic components (321) arranged in a pressing direction; and
    the cross-shaped lifting plate (320) is provided with four end segments, each of the end segments corresponds to each of the pairs of the side-pushing self-pressing sliding blocks (30), and each of wedge-shaped fitting structures is defined between each of the end segments and the corresponding pair of the side-pushing self-pressing sliding blocks (30), when the cross-shaped lifting plate (320) descends, the two side-pushing self-pressing sliding blocks in each of the pairs of the side-pushing self-pressing sliding blocks (30) move closely under action of the corresponding wedge-shaped fitting structure.

5. The welding fixture according to claim 4, wherein the wedge-shaped fitting structures comprise:
    a wedge-shaped groove (300) disposed on each of the side-pushing self-pressing sliding blocks (30); and
    inclined parts (322) with splayed distribution, disposed on two sides of each of the end segments in a length direction respectively; wherein the inclined parts (322) on each of the end segments extend into the corresponding wedge-shaped grooves (300) to make the two side-pushing self-pressing sliding blocks (30) in each of the pairs of the side-pushing self-pressing sliding blocks (30) move closely.

6. The welding fixture according to claim 4, wherein the side-pressing canceling control assembly (32) further comprises:
    an avoidance hole (323) disposed at a center of the cross-shaped lifting plate (320);
    a control handle (324) connected to the base (1) through a hinged structure passing through the avoidance hole (323), and wherein the control handle (324) is disposed on an upper surface of the cross-shaped lifting plate (320);
    a side-pressing plane (325) disposed on the control handle (324); wherein when the side-pressing plane (325) coincides with the upper surface of the cross-shaped lifting plate (320), the vertical elastic components (321) force the cross-shaped lifting plate (320) to reset upwards and the transverse elastic parts (31) force the corresponding side-pushing self-pressing sliding blocks (30) to press the sides of the workpieces tightly; and
    canceling side-pressing curved surfaces (326) disposed on the control handle (324); wherein when the control handle (324) is rotated, one of the canceling side-pressing curved surfaces (326) is in contact with the upper surface of the cross-shaped lifting plate (320), and the transverse elastic parts (31) are forced to shrink elastically under the action of the wedge-shaped fitting structures to cancel tight pressing of the sides of the workpieces.

7. The welding fixture according to claim 5, wherein the base (1) is provided with wedge-shaped limiting blocks (33) located below the respective end segments, and each of the wedge-shaped limiting blocks (33) is configured to limit the inclined parts (322) on each of the end segments from excessive downward descent.

8. The welding fixture according to claim 6, wherein a lower surface of the top pressing plate (2) is provided with a cross-shaped guide groove (21), the cross-shaped lifting plate (320) is disposed in the cross-shaped guide groove (21), a handle avoidance through hole (22) is provided in a central area of the top pressing plate (2), and the control handle (324) passes through the handle avoidance through hole (22).

9. The welding fixture according to claim 4, wherein the vertical elastic components (321) have two groups, and the two groups of the vertical elastic components (321) are distributed in the X-axis direction or the Y-axis direction.

10. The welding fixture according to claim 1, wherein a vertical guide mechanism (4) is connected between each of two diagonal areas of the top pressing plate (2) and the base (1).

11. The welding fixture according to claim 1, wherein two numbers of locking control frames (5) disposed at two ends of the top pressing plate (2) in a length direction are hinged to the base (1), and the locking control frames (5) are locked at the two ends of the top pressing plate (2) in the length direction respectively.

12. A locking method for welding, by using the welding fixture according to claim 6, wherein the locking method comprises:
  S1, placing: placing the workpieces on the workpiece positioning dies (10); and
  S2, tight pressing: pressing, by the top pressing plate (2), the top surfaces of the workpieces; and pressing, by the side-pressing mechanism (3), the sides of the workpieces tightly.

13. The locking method for welding according to claim 12, wherein in the step S2, the pressing, by the side-pressing mechanism (3), the sides of the workpieces tightly comprises:
  S20, the tight pressing: rotating the control handle (324), when the side-pressing plane (325) coincides with the upper surface of the cross-shaped lifting plate (320), forcing, by the vertical elastic components (321), the cross-shaped lifting plate (320) to reset upwards and forcing, by the transverse elastic parts (31), the corresponding side-pushing self-pressing sliding blocks (30) to press the sides of the workpieces tightly; and
  S21, canceling of the tight pressing: rotating the control handle (324); when one of the canceling side-pressing curved surfaces (326) is contact with the upper surface of the cross-shaped lifting plate (320), forcing the transverse elastic parts (31) to shrink elastically under the action of the wedge-shaped fitting structures, thereby to cancel the tight pressing of the sides of the workpieces.

* * * * *